April 7, 1936.  M. J. WALL  2,036,732
WELDING PROCESS AND APPARATUS
Filed July 22, 1931  2 Sheets-Sheet 1

INVENTOR:
Matthew J. Wall,
BY ATTORNEYS
Byrnes Townsend & Potter

April 7, 1936.  M. J. WALL  2,036,732
WELDING PROCESS AND APPARATUS
Filed July 22, 1931  2 Sheets-Sheet 2
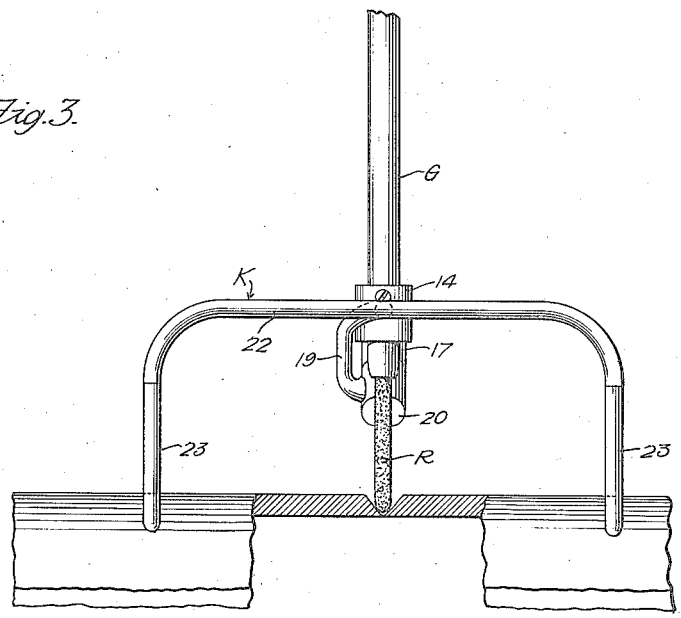
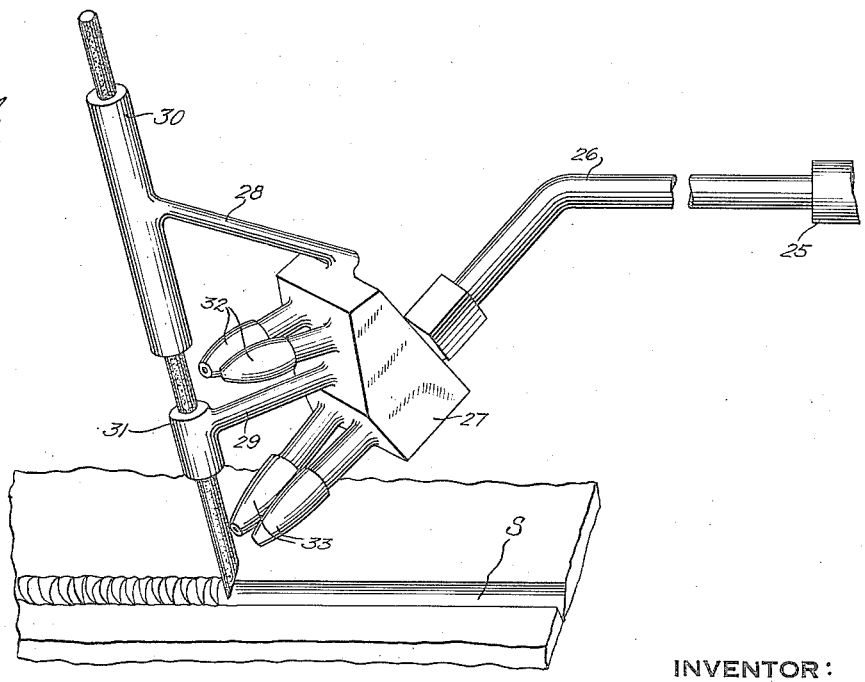
INVENTOR:
Matthew J. Wall,
BY  ATTORNEYS Patented Apr. 7, 1936

2,036,732

UNITED STATES PATENT OFFICE 2,036,732

WELDING PROCESS AND APPARATUS

Matthew J. Wall, Jersey City, N. J., assignor, by mesne assignments, to Union Carbide and Carbon Corporation, a corporation of New York Application July 22, 1931, Serial No. 552,467

38 Claims. (Cl. 113—59)

This invention relates to a welding process and to apparatus for performing the same. While the oxy-acetylene flame is particularly applicable and advantageous as a source of heat in the improved process and the herein-disclosed apparatus is especially designed for hand operation, it will be understood that other sources of heat may be employed and features of the apparatus may be incorporated in semi-automatic or full automatic welding machines.

Heretofore, in fusion welding by hand except in metallic-arc welding where the welding current is supplied through the welding rod itself, it has been the general practice for the operator to hold the welding rod or rods in one hand and a welding blowpipe or torch in the other hand and to oscillate both the rod and the torch back and forth across and along the V formed by the contiguous edges to be united. This requires the use of both hands, is fatiguing, and the movements of the rod and the torch often are not properly coordinated for fast welding. Furthermore, it has been generally necessary for the welder to occupy a position substantially at a right angle to the seam being welded and in close proximity thereto to observe the progress of the weld and to properly apply the heat and the weld metal to the contiguous metal edges to produce a satisfactory weld. In this position the welder cannot easily see both sides and the bottom of the V and therefore works under considerable strain and uncomfortably near the welding heat.

The principal object of this invention is to provide an improved process and apparatus whereby hand welding of better quality may be performed faster than heretofore, with less fatigue and discomfort to the welder.

A further object of this invention is to provide an improved process and apparatus whereby high-temperature heat from any suitable source may be applied effectively to a metal article and readily manipulated relatively thereto in performing in operation on such article.

Generally speaking, according to this invention the welding torch and rod as a unit are moved lengthwise relatively to the edges to be welded, the flame or flames of the torch and the welding rod or rods being disposed substantially symmetrical to a plane, or in a vertical plane, intersecting the V between said edges. The welding flame is applied to the bottom and sides of the V ahead of the rod, and the welding rod and flame converge at the welding point where the base metal and the lower end of the rod are melted to produce a puddle of fluid metal. The lower end of the rod rests directly in the puddle and, as it melts, the rod is automatically fed, e. g., by its own weight, into the welding heat and the progressively-formed puddle.

Successive portions of the welding rod may be preheated before they reach the welding flame and the puddle. To control the welding operation, the torch may be operated to move its flame away from or toward the welding point and up or down the rod while the latter rests in the puddle, thus varying both the fluidity of the puddle and the rod melting rate. To prepare or "wet" the V or to chill the puddle, as required, the welding rod and the flame as a unit may also be moved slightly back and forth along the seam, thus rubbing the rod in the puddle or playing the flame in the V farther ahead of the puddle.

Suitable apparatus for performing the improved welding process may include an oxy-acetylene torch, the gas-conducting stem of which has the usual welding tip or tips and is of sufficient length to remove the handle of the torch a substantial distance from the welding flame. Most of the weight of the torch may be supported by a carriage adjustably secured to the torch head. This carriage extends rearwardly of the torch head and has appropriate means, such as runners, which slidably rest upon the work on opposite sides of the seam or working line behind the welding point. The welding rod may be fed to the welding point through a guide such as a tube which is slightly larger in cross-section than the rod, and is secured either to the torch head or to the carriage in such a position, preferably between the torch head and the point of support of the carriage, that the welding rod may be freely and accurately fed to the welding point. With this apparatus the welder may perform the welding operation at a comfortable distance from the heat and directly opposite the V in full view of the welding, manipulating the apparatus with either hand and leaving the other hand free. When the work is stationary the apparatus may be moved with little effort along the surface of the work lengthwise of the seam; and in case the work is moved the apparatus may rest on the work and be held stationary, the runners on the carriage in both instances permitting the apparatus to slide relatively to the work and providing a fulcrum about which the welding flame may be raised and lowered at will by the torch-holding hand which acts through a long leverage.

The objects and the novel features of this invention are more fully disclosed in the following description taken with the accompanying drawings, in which, Fig. 1 is a perspective side view of an apparatus embodying this invention, showing the same as used in welding a seam between curved surfaces, as in joining pipe sections end to end.

Fig. 3 is a rear view of the apparatus in the position as shown in Fig. 1.

Fig. 4 is a view of another apparatus embodying features of the improved apparatus and adapted to facilitate welding according to this invention.

Figure 1:
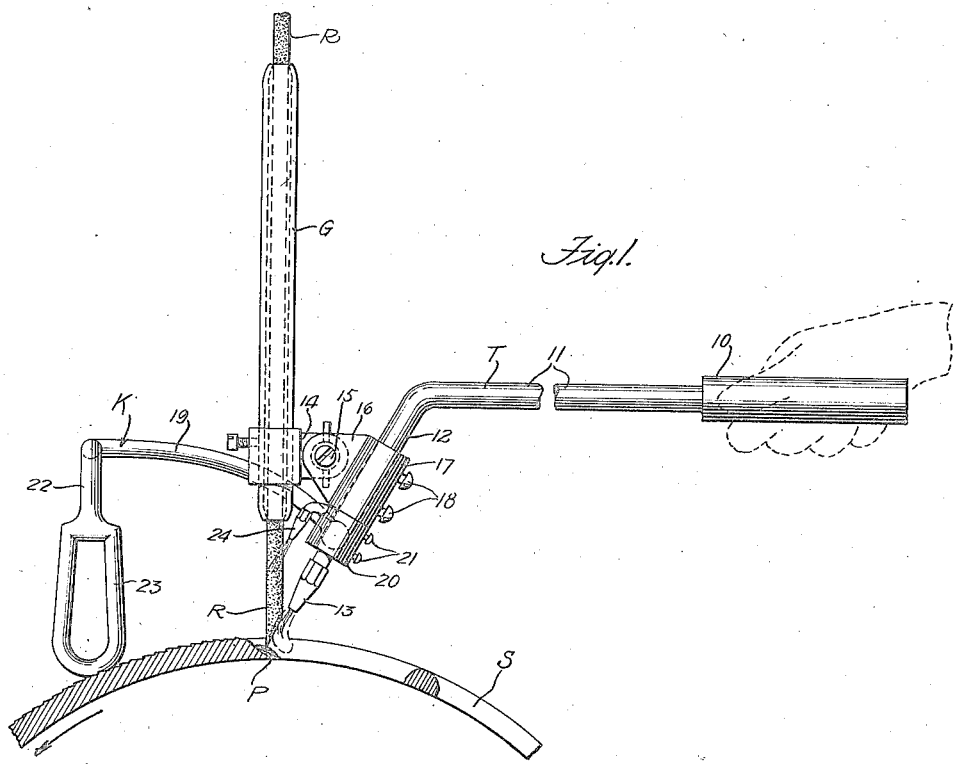
Figure 2:
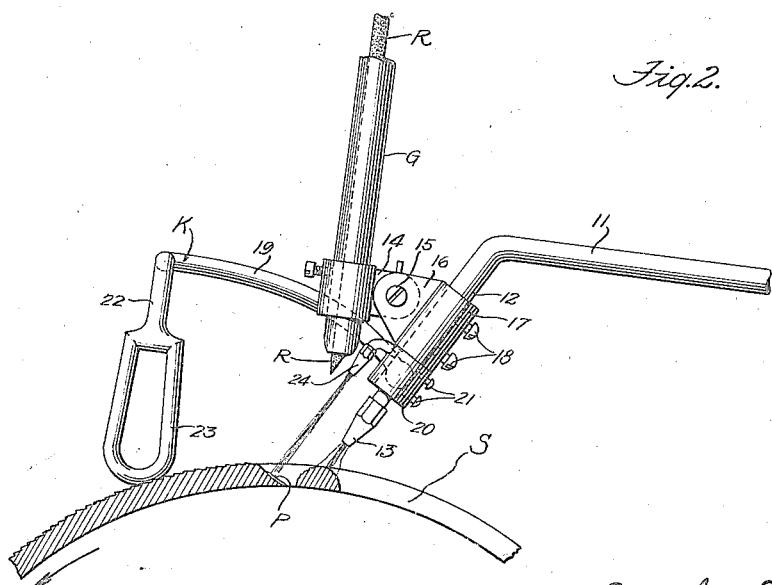
Fig. 2 is a view similar to Fig. 1, showing the welding rod as raised and the apparatus as in position for preparing a tack for welding.

As shown in Figs. 1, 2, and 3 a typical form of the improved apparatus comprises an oxy-acetylene welding torch T having a suitable handle including a grip 10 and a tubular stem 11 through which a combustible gas mixture is delivered and which is normally held substantially horizontal. The outer end of the stem 11 may be inclined downward and away from the handle to provide a welding head 12 to which the welding gases or mixture may be conducted by the stem. A suitable tip 13 at the lower end of the head is provided with an orifice to deliver the combustible gas mixture to maintain a welding flame and direct the latter onto the work and against the lower end of a metal welding rod R which is automatically fed into the welding flame and the molten metal puddle P at the welding point on the work.

The welding rod R, usually supplied in three foot lengths, is held in a position that is vertical or slightly inclined from the vertical and normally has its lower end resting in the puddle, so that the welding flame and the welding rod normally converge at the puddle or welding point. As shown, a suitable means for holding the rod R in this position, so that it may automatically feed by gravity into the flame and puddle, comprises a tube G which is of a slightly greater cross-sectional size than the rod R to permit the latter to freely feed therethrough as its lower end is melted and deposited in the V. The inside of the holding and guiding tube may be of suitable cross-sectional shape to automatically feed welding rods of various shapes, such as circular, oval, square, rectangular hexagon and diamond cross-sections, in single, double or triple parallel or converging relation. At its opposite ends, the tube G may be turned in slightly to provide a little less clearance between the tube and the rod at these points and thereby avoid excessive friction between the tube and those parts of the rod which may be irregular or bowed. The tube G may be adjustably mounted on the torch head 12 as by means of an apertured ear 14 on the tube which is secured by a bolt 15 to an ear 16 on a collar 17 adjustably secured to the head 12 by set screws 18. The tube and torch are thus connected together and held in fixed relation as a unit and lie in the same plane and, during the welding operation, the apparatus is positioned so that this plane intersects the V formed by the opposed beveled edges to be united.

The head end of the torch as well as the guide tube G and the welding rod therein are suitably supported by stationary work so that this welding unit may be moved along the surface of the work lengthwise of the V; or supported upon the work but held stationary when the work is moved. The advantageous supporting means shown comprises a carriage K having a bar 19, one end of which is rigidly secured to a collar 20 adjustably mounted on the torch head by set screws 21. The other end of the bar 19 is secured to a cross arm 22 which has a pair of parallel runners 23 secured to and depending from its ends. These runners may vary in shape and desirably have curved or rounded bottom portions whereby they are adapted to engage and slide relatively to the top surface of the work at substantially equal distances on opposite sides of the seam S or working line and a short distance back of the guide tube G. Besides supporting practically all of the weight of the apparatus on the work, the runners have another important function in that their rounded lower ends, which are in planes parallel to the working line, serve as rockers and provide a fulcrum on the work rearwardly or to one side of the guide tube and torch head, about which the apparatus may be rocked by the handle from the side of the torch head opposite to that of the fulcrum so as to raise and lower the welding flame relatively to the puddle and the welding rod.

While not essential in all classes of welding, it is generally advantageous to preheat the welding rod before it reaches the direct heat of the welding flame, although some of the heat from the welding zone passes through and around the guide tube and preheats the rod to some extent. To more positively preheat the welding rod, an additional but smaller tip 24 may be mounted on the torch head above the outlet end of the welding tip 13. The preheating tip 24 has a passage communicating with the main combustible mixture passage in the torch head and is parallel to or sharply inclined to the axis of the welding flame so as to direct a flame against successive portions of the welding rod and heat them to a bright cherry red, preferably just before they reach the welding flame.

The improved apparatus is adapted for general use, in welding flat work such as sheets or plates, as well as curved work such as pipe sections united end to end by a girth seam. In plate welding the apparatus is preferably propelled along the V between the edges to be welded but the work may be moved lengthwise of the V past the stationary apparatus, whereas in producing a curved or circular weld between the opposed ends of two pipe sections it is decidedly preferable to rotate the pipe sections in unison while the apparatus is held stationary on the upper surface of the pipe with the welding flame and rod converging approximately at the center of this surface, as indicated in Fig. 1. Otherwise, the welding procedure about to be explained is substantially the same for all purposes.

Before starting the main welding operation and the ends of the pipe sections having been beveled, the sections are alined, either with or without an inserted liner to close the bottom of the V formed by the opposed ends. These ends are then desirably "tacked" together by depositing weld metal in the V at a number of spaced points throughout the circular seam by well known hand welding procedure. Thereupon, the operator stands or sits at the side of the pipe facing the V or joint and rests the runners on that part of the top surface which is curved away from him,—holding the torch handle with one hand and setting the head and tip of the torch as well as the guide tube in the plane of the V with the carriage straddling the V. After the torch has been lighted and while it plays into the V, the oxygen and acetylene valves of the torch are adjusted to provide the proper welding flame,—preferably one containing a sufficient excess of acetylene to carburize the surfaces of the V about ¼" to ½" ahead of the puddle formed during welding, so that these surfaces will "sweat" or melt superficially at a lower temperature than the base metal, as disclosed in the patent of Harry S. George, No. 1,973,341, issued September 11, 1934.

When the walls of the V are approximately in a molten or "sweated" condition, the welding rod is inserted in the guide tube and lowered until its end is in the preheating flame supplied by the tip 24. When the base metal is melted, the rod, which in the meantime has been properly preheated, is lowered into the puddle for starting the welding operation. An assistant thereupon uniformly rotates the tacked pipe sections in unison in the direction of the arrow—the upper halves moving away from the welder—while the welder holds the apparatus so that the welding point or puddle will be maintained approximately in the top longitudinal center line of the pipe. If the welding point is too far forward, the molten metal flows ahead and bridges over the bottom of the V, producing an insufficiently penetrated weld. On the other hand, if the welding point is too far back of the top center line, the puddle may become so long that the molten metal spills over instead of solidifying in the machine-like contour desired.

Normally, the torch handle is held steady while the runners slide along the surface of the rotating pipe, the handle being preferably held substantially horizontal or in such a position that the welding flame impinges partly on the end of the welding rod, but principally on the base metal to superficially melt or "wet" the sides and bottom of the V ahead of the puddle so that the molten weld metal will properly penetrate the V and unite therewith. In case the base metal is not wetting as rapidly as the rod is being fused, the handle may be lowered, thus lowering the torch about the fulcrum provided by the runners and thereby applying the welding flame less onto the welding rod and more directly onto the base metal to facilitate the preparation of the latter for fusion. Conversely, if the wetting proceeds relatively faster than the melting of the welding rod, the melting and deposition of the latter may be accelerated by raising the handle slightly so as to cause the welding flame to impinge more directly onto the rod. The fastest welding is accomplished when the rod is melted and deposited at a sufficient rate to more or less solidify instantly back of the rod, the rod melting in a semi-plastic state to fill the properly prepared part of the V. During these up and down adjustments of the flame, the guide tube may slide relatively to the rod, so that the latter continues resting on the puddle shelf that normally slopes forward toward the bottom of the V in the direction of welding.

The fluid puddle preferably should not extend more than ½" to ¾" back of the end of the rod therein. If the puddle becomes too long or too fluid it may be chilled and reduced in size by a slight forward and backward movement of the torch which accelerates the melting and deposition of the rod to both build up the reinforcement and to solidify the puddle. By raising the welding flame, the latter impinges more directly on the welding rod and melts it more rapidly, which will start solidification of the puddle and shorten the latter. The main reasons for this appear to be that the welding flame, since it impinges on the rod, is thereby shielded from the puddle behind the rod and prevented from blowing the puddle and overheating both the base metal and the puddle. Also, the rod is melted faster but this molten rod metal is cooler than the superheated puddle and consequently when it is deposited into the puddle the latter is chilled somewhat and its solidification is accelerated.

When obstructions such as tacks or liner lugs are encountered along the V, the welding may be carried to within ¼" to ½" of the tack, for example, whereupon the welder may raise the rod with his free hand sufficiently to remove the lower end of the rod above the welding and preheating flames, but retaining the rod in the guide tube while moving the torch forward so as to preheat the tack metal. When the tack metal has been sufficiently heated to take the wetting action, the torch may be moved backwards and the rod restored to its normal position, the puddle having been kept in a molten condition ready for the continuation of the welding by the heat of the rod preheating flame. The welding is then carried over the tack. In finishing the circumferential weld or joining one end to the other, the same procedure may be followed as in welding over a tack.

Since the range of the positions of the welding point in pipe welding is narrow, the rotation of the pipe should be coordinated with the welding. The pipe should be turned uniformly, keeping the welding point approximately at the top center line, the turner temporarily stopping the rotation of the pipe when the welder lifts the welding rod, as in passing over a tack.

Since the operator is relieved of the exertion of holding and manipulating the welding rod, it is possible to use heavier rods such as those of larger cross-section and greater length. The size and capacity of the torch may also be increased without overburdening the operator. These are important advantages in some classes of welding where it is more economical to use a welding rod of greater diameter and proportionally larger preheating and welding tips and flames. Rods may also be consumed to a shorter length. Heretofore, the shorter lengths could not be handled easily due to the heat on the operator's hand. In the present apparatus, when three or four inches of the rod remain unconsumed, the remainder of the rod may be flipped out of the holding and guiding tube by a simple raising and twisting of the apparatus and a new rod inserted with little interruption of the welding. Fluxed and coated welding rods may be used more advantageously in the present invention. In the usual procedure a considerable length of the rod coating is exposed to the torch flame, causing the flux to break off of the rod, whereas the rod coating may be protected in the present apparatus until it gets close to the welding point.

The position of the operator during the welding is such that discomfort and the usual fatiguing manipuation are practically eliminated. This position enables the operator to more closely and conveniently watch the welding and to produce better welds much faster than has heretofore been possible. With one hand free, he may adjust the gas supply valves, adjust and change the welding rod, signal the turner, or shift the handle of the apparatus from one hand to the other, with no interruption to the welding operation. The increased efficiency thus obtained in the speed of welding and the saving in gas consumption is supplemented by the effective utilization of the welding heat afforded by the inclination of the welding rod to the welding flame whereby the latter is largely confined between the rod and the V ahead of it. In fact, hand welding performed according to this invention closely approximates machine welding in speed and economy, and in the quality and contour of the resulting weld.

While it is preferable to employ a carriage with runners to support most of the weight of the welding apparatus on the work, as shown in Figs. 1 and 2, some of the advantages of this invention may be obtained with a welding apparatus in which the carriage and its runners are omitted. A typical apparatus of this type is disclosed in Fig. 4 of the drawings and comprises a handle 25 and a stem 26 similar to the one shown in Fig. 1. The front or inclined end of the stem may carry a mixture distributing head 27 having one or more welding tips and one or more preheating tips secured thereto. Suitable means for holding the welding rod and feeding it by gravity to the puddle and in correct relation to the preheating and welding flames may also be mounted on the torch head or on the end of the torch stem. As shown, brackets 28 and 29 secured to the torch head carry suitable alined tubular guiding members 30 and 31 having an internal cross-sectional size slightly larger than the welding rod to be used, so that the latter may feed by its own weight as it melts into the puddle in which it rests. A pair of converging preheating tips 32, 32 may be used to apply a flame to the welding rod at a point between the tubular guides 30 and 31 to preheat the rod to a bright cherry red before it reaches the welding zone. A pair of converging welding tips 33, 33 may be arranged, as shown, to apply a welding flame at an inclination to the welding rod and to the V ahead of the latter. This apparatus functions and is manipulated substantially in the same manner as the one shown in Figs. 1 and 2, except that the absence of the carriage and its runners as a support and a fulcrum requires more skill and exertion by the operator, and any rotation thereof to vary the heat balance is about an imaginary axis, rather than a real one, behind the puddle.

While the improved welding apparatus and procedure have been described in detail, it will be understood that various changes may be made in details of the apparatus without departing from the spirit of this invention or sacrificing any of its advantages.

I claim:

1. Process of welding contiguous metal edges which comprises normally maintaining a welding rod and high-temperature heating means in fixed relation; moving said rod and said heating means as a unit lengthwise of such edges while feeding such rod toward said edges as it is melted; and controlling the fusion of said edges and said rod by said heating means during such movement, by raising and lowering the heating means relatively to said edges and said rod.

2. Process of welding contiguous metal edges which comprises normally maintaining a welding rod and high-temperature heating means in fixed relation; moving said rod and said heating means as a unit lengthwise of such edges while automatically feeding such rod toward said edges as it is melted; and during such movement raising and lowering said heating means about an axis behind the welding point and relatively to said edges and said rod to control the fusion of said edges and said rod by said heating means.

3. Process of welding contiguous metal edges which comprises normally maintaining a welding rod and high-temperature heating means in fixed relation; moving said rod and said heating means as a unit lengthwise of such edges while feeding such rod by gravity toward said edges as it is melted; and controlling the fusion of said edges and said rod by said heating means during such movement, by raising and lowering the heating means relatively to said edges and said rod; said heating means comprising a welding flame, the raising and lowering of which is effected by moving it about an axis behind the welding point.

4. Process of welding contiguous metal edges, which comprises spacing the edges to be welded so as to form a seam; moving a welding flame along the seam and normally maintaining a welding rod in definite uniform relation to said flame so that the metal of the rod will be melted into the seam by the flame; and controlling the character of the molten metal in the seam by moving the flame along the rod to and from the seam in definite uniform relation to the rod.

5. The process of welding contiguous metal edges together along a seam which consists in moving a welding rod along the seam and melting the metal thereof progressively into the seam by a heating means advancing along the seam ahead of the rod; and controlling the fluidity of the molten metal within the seam by adjusting the heating means about an axis rearwardly of the welding point.

6. The process of welding contiguous metal edges together along a seam which consists in moving a welding rod along the seam and melting the metal thereof progressively into the seam by a heating means advancing along the seam ahead of the rod; maintaining the lower end of the rod at all times on the bottom of the seam between the heating means and the finished weld; and controlling the fluidity of the molten metal within the seam by oscillating the heating means and rod about a common axis rearwardly of the rod.

7. The process of welding contiguous metal edges together along a seam which consists in moving a welding rod along the seam and melting the metal thereof progressively into the seam by a heating means advancing along the seam ahead of the rod; maintaining the rod at all times between the heating means and finished weld; and controlling the fluidity of the molten metal within the seam by raising and lowering the heating means about an axis rearwardly of the welding point.

8. The method of welding the edges of two metallic members together which consists in bringing the edges into opposition to form a seam; moving a welding rod and a heating means along the seam in such relation to each other that the rod will be progressively melted to form a molten puddle in the seam; and controlling the fluidity of metal in the seam by movements of the flame to and from the seam in definite uniform relation to the rod and while continuously playing the flame on the rod.

9. The combination with means for applying high temperature heat to a metal article, means providing a fulcrum for such heating means at one side of the point where the heat is applied to the article, such fulcrum-providing means comprising elements disposed in planes spaced from and on each side of the working line on the work, and manually operable means disposed at the side of the point where the heat is applied to the article opposite to that of such fulcrum for manipulating said heating means about said fulcrum during the time the heat is applied.

10. In welding apparatus, the combination of means adapted to provide welding heat, means adapted to guide a welding rod to the welding region, means for maintaining such heating means and guide means in fixed relation, means adapted to provide an axis about which said heating means and guide means are adjustable, the means which provides said axis being positioned at one side of the welding region to permit manual adjustment of said heating means and guide means during welding from the opposite side of the welding region with substantially an unobstructed view of the welding region.

11. In manually operable welding apparatus, the combination of means adapted to guide a welding rod to the welding region, means adapted to provide welding heat, means for maintaining such guide means and heating means in fixed relation, means adapted to provide an axis about which said guide means and heating means are adjustable, said axis being disposed at one side of the welding region, and means for manually adjusting during welding said guide means and heating means about said axis from a position at the opposite side of the welding region to that of said axis.

12. In manually operable welding apparatus, the combination of means adapted to provide welding heat, means adapted to guide a welding rod to the welding point, means for maintaining such heating means and guide means in fixed relation, means adapted to provide an axis about which said heating and guide means are adjustable, such axis being disposed at one side of the welding point, and means including a lever arm extending from the opposite side of the welding point to that of said axis for manually adjusting said heating and guide means during welding to and from the work about said axis.

13. A manually operable apparatus for use in welding two members together along a seam; said apparatus comprising a guide for directing a welding rod into the welding region; heating means secured to the guide in position to direct heat upon said region when the device is in welding relation to said region; said apparatus being rockable about an axis rearwardly of the welding region; and a second heating means for preheating the rod before it reaches the welding region.

14. In portable welding apparatus, the combination of means adapted to provide welding heat, means adapted to guide a welding rod to the welding point, means for maintaining such heating means and guide means in fixed relation, and non-rotary means including a pair of runners adapted frictionally to contact the work for supporting said heating means and guide means, said heating means and guide means being adjustable about the line of contact of said runners upon the work.

15. In welding apparatus, the combination of a carriage; a torch for heating a welding region and a welding rod guide secured to the carriage; said carriage having members adapted to rockably rest on work to be welded; means for manually rocking the torch about the line of contact between the members and the work from a position forwardly of the welding region; said members being positioned to afford an unobstructed view of the welding region from a forward position when the apparatus is in welding position on the work.

16. The combination with means for applying high temperature heat to a metal article, of a carriage carrying only a portion of the weight of such heating means, said carriage comprising supporting members having curved portions adapted frictionally to contact and slide along the surface of the article and providing a fulcrum, such frictional contact tending to resist free sliding movement of said supporting members upon the work, and means for oscillating said heating means about said fulcrum.

17. In welding apparatus, the combination of means adapted to provide welding heat, means for guiding a welding rod to the welding region, means for maintaining such heating means and guiding means in fixed relation during welding, and means adapted frictionally to engage the work and slidably support said heating means and guiding means at a distance from the welding region, said heating means and guiding means being adjustable to and from the work about the point of frictional engagement of said supporting means upon the work.

18. A manually operable welding apparatus comprising the combination of means including a torch for applying heat upon a welding region, a carriage for supporting said torch in a welding position upon the work, means carried by said carriage for directing and guiding welding material to the welding region, means arranged to provide a fulcrum for said carriage at one side of said torch, and a handle extending from said carriage at the side of said torch opposite to that of said fulcrum for manually oscillating said carriage about said fulcrum to manipulate said torch to and from the work.

19. A manually operable welding apparatus comprising the combination of a carriage adapted to be supported on the work, means including a torch to provide welding heat, a guide for directing a welding rod to the welding region, said torch and guide being supported by said carriage, means for fulcruming said carriage at one side of said torch, and means at the side of said torch opposite to that of such fulcrum for manually oscillating said carriage and the torch and guide supported thereby about said fulcrum.

20. In manually operable apparatus of the class described, the combination of means for delivering a gaseous heating jet on the work to be operated upon, a carriage upon which said jet delivering means is mounted, and means adapted to slide along the work in frictional contact therewith for supporting said carriage, such supporting means comprising elements adapted to be spaced from and on each side of the working line on the work, the line of contact of said elements upon the work serving as a fulcrum rearwardly of the zone heated by the jet about which an oscillatory movement of said carriage can be manually effected.

21. In manually operable apparatus of the class described, the combination of means for delivering a gaseous heating jet on the work to be operated upon, a carriage upon which said jet delivering means is mounted, said carriage including runners adapted to contact and slide along the work for partially supporting the same at a point rearwardly of the zone heated by the jet, such runners being spaced from the working line on the work when said carriage is in an operative position, and manually operable means for oscillating said carriage during welding about a fulcrum formed at the line of contact of said supporting runners upon the work.

22. The combination with a carriage, of a blowpipe mounted thereon, such carriage being provided with supporting elements having curved portions adapted frictionally to contact and slide along the work, said curved portions serving as rockers disposed in substantially parallel planes spaced from and on each side of the working line on the work, and means for oscillating said carriage on said rockers.

23. The combination with a carriage, of a blowpipe mounted thereon for applying a gaseous heating jet on the work, such carriage being provided with supporting elements having curved portions adapted frictionally to contact and slide along the work, said curved portions serving as rockers disposed in substantially parallel planes spaced from and on each side of the working line on the work, and means including a handle for manually effecting a rocking movement of said carriage about said curved portions, said last-mentioned means including said handle having at least one passage therein communicating with said jet applying means for delivering a combustible gas thereto.

24. A manually operable apparatus comprising the combination of means for guiding a welding rod to a welding point in a seam to be welded; means for applying a gaseous heating jet upon the welding point; means for directing a second gaseous heating jet upon the welding rod before it reaches the welding point; a carriage upon which said guiding means and both such jet directing means are mounted; said carriage having spaced runners adapted to straddle a seam when said apparatus is in welding position; said runners having curved portions adapted frictionally to contact and slide along the work and serving as rockers; and means including a handle for rocking said apparatus about said curved portions; said rocking means including said handle having at least one passage therein communicating with both said jet directing means for delivering a combustible gas thereto.

25. A manually operable apparatus for welding two work members together along a seam comprising means for guiding a welding rod toward the welding region, means including a blowpipe having a handle for providing welding heat, a carriage upon which such guiding means and blowpipe are mounted, at least two supporting runners associated with said carriage arranged to straddle the seam when the latter is in a welding position and having the ends thereof adapted to contact and slide along the work, the line of contact of said runners upon the work providing a fulcrum at one side of the welding region, and means including said blowpipe handle extending from the side of the welding region opposite to that of said fulcrum for manually oscillating said carriage about said fulcrum.

26. In manually operable apparatus of the class described, the combination of means for guiding a welding rod toward a welding point in a seam to be welded, means for directing a gaseous heating jet upon the welding point, a carriage upon which such guiding means and jet directing means are mounted, two runners associated with said carriage arranged to straddle the seam when the latter is in a welding position and adapted to contact and slide along the work to provide a two point support for said carriage at one side of said jet directing means, and means including a handle extending from said carriage and away from said jet directing means in a direction opposite to that of the points of contact of said runners upon the work and adapted to be grasped by an operator to provide a third point of support for said carriage.

27. A manually operable welding apparatus comprising means for guiding a welding rod to a welding point in a seam to be welded, means for directing a gaseous heating jet upon the welding point, means for directing a second gaseous heating jet upon the welding rod before it reaches the welding point, a carriage upon which such guiding means and both such jet directing means are mounted, two runners associated with said carriage arranged to straddle the seam when the latter is in a welding position and adapted frictionally to contact and slide along the work to provide a two-point support for said apparatus at one side of the welding point, and means including a handle extending from said carriage away from the welding point in a direction opposite to that of the line of contact of said runners upon the work and adapted to be grasped by an operator to provide a third point of support for said apparatus.

28. A manually operable welding apparatus comprising means for guiding a welding rod toward a welding point in a seam to be welded, means for directing a gaseous heating jet upon the welding point, means upon which such guiding means and jet directing means are mounted including two runners arranged to straddle the seam in the same plane at right angles thereto when the apparatus is in a welding position and having the ends thereof adapted frictionally to contact and slide along the work, the line of contact of said runners upon the work providing a fulcrum about which said apparatus is rockable, and means including a handle adapted to be grasped by an operator for manually effecting a rocking movement of the apparatus, said last-mentioned means including said handle having at least one passage therein communicating with said jet directing means for delivering a combustible gas thereto.

29. In welding apparatus the combination of a heating unit for providing welding heat at a welding point in a seam adapted to be welded; a frame having at least one arm extending from said heating unit; supports secured to said frame adapted to rest on the work; a member mounted on said apparatus, extending substantially vertically when said apparatus is in an operative position on the work, for guiding a welding rod to the welding point; said arm extending substantially perpendicular to said member.

30. In welding apparatus, the combination of a heating unit for providing welding heat at a welding point; a guide for directing a welding rod to such point; means for adjusting the relative position of said heating unit with respect to said rod guide, and means for maintaining said heating unit and said rod guide in fixed adjusted position during welding.

31. In welding apparatus, the combination of a heating unit for providing welding heat at a welding point in work; a guide for directing a welding rod to such welding point and normally in fixed angular relation with said heating unit during welding, and means for adjusting the angular relation of said heating unit relative to said rod guide.

32. In welding apparatus, a welding unit comprising means for guiding a welding rod to a welding point; means for applying welding heat to said welding point; and means for rigidly securing such guiding means to such heat-applying means, such securing means including a pivotal connection whereby said guiding means may be adjusted angularly relatively to said heat-applying means.

33. In welding apparatus, the combination of heating means for providing welding heat at a welding point; means adjustable relatively to the heating means and adapted to direct a welding rod to said point; and means adjustably connected with the apparatus for supporting the same on work to be welded.

34. In welding apparatus, the combination of a welding nozzle for directing welding heat to a welding region; a guide for directing a welding rod to the welding region; and independent means constructed and arranged for directing a preheating jet onto and downwardly along the rod into the welding region.

35. In welding apparatus, the combination of a guide normally arranged to be in substantially a vertical position during welding to enable a welding rod to be fed freely and continuously by force of gravity to a welding point; means for directing a heating flame upon the welding point and upon the lower end of the welding rod; and adjustable connecting means whereby said guide is angularly adjustable relatively to such flame-directing means and whereby said guide and said flame-directing means may be rigidly secured together, as a unit, in any one of such positions of angular adjustment.

36. In a welding apparatus of the character described; a holding tool comprising a guide adapted to receive a welding rod slidably therein so as to feed the same by gravity into a seam; and a heating unit connected to the guide so as to bear a definite fixed relation to the rod in all positions of the guide along the rod; said holding tool being freely rockable about an axis rearwardly of the guide with respect to the progress of the weld along a seam.

37. In welding apparatus, the combination of a rod guide; a torch for directing a flame upon the rod and upon the work being welded; means whereby the guide and the torch are secured together so as to be angularly adjustable one relatively to the other; and supporting means for said apparatus, said guide being disposed between said torch and said supporting means.

38. In a welding apparatus; heating means; a guide tube for a welding rod connected to the heating means; said guide tube having a bore therethrough of a diameter throughout its length greater than the rod to be fed therethrough and said bore being constricted at both ends of the tube.

MATTHEW J. WALL.